United States Patent
Resch et al.

(10) Patent No.: US 11,543,964 B1
(45) Date of Patent: Jan. 3, 2023

(54) EFFICIENT REBUILDING OF AN ENCODED DATA SLICE

(71) Applicant: Pure Storage, Inc., Mountain View, CA (US)

(72) Inventors: Jason K. Resch, Chicago, IL (US); Greg R. Dhuse, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 17/248,885

(22) Filed: Feb. 11, 2021

Related U.S. Application Data

(63) Continuation of application No. 16/396,399, filed on Apr. 26, 2019, now abandoned, which is a continuation-in-part of application No. 15/405,004, filed on Jan. 12, 2017, now Pat. No. 10,324,623, which is a continuation of application No. 14/088,897, filed on Nov. 25, 2013, now Pat. No. 9,558,067.

(60) Provisional application No. 61/748,916, filed on Jan. 4, 2013.

(51) Int. Cl.
*G06F 11/00* (2006.01)
*G06F 3/06* (2006.01)
*G06F 11/10* (2006.01)

(52) U.S. Cl.
CPC ............ *G06F 3/0604* (2013.01); *G06F 3/064* (2013.01); *G06F 3/067* (2013.01); *G06F 3/0629* (2013.01); *G06F 3/0644* (2013.01); *G06F 11/1076* (2013.01); *G06F 11/1092* (2013.01); *G06F 3/0619* (2013.01); *G06F 3/0643* (2013.01); *G06F 2211/1028* (2013.01)

(58) Field of Classification Search
CPC ............................ G06F 11/1097; G06F 3/067
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay |
| 5,485,474 A | 1/1996 | Rabin |
| 5,774,643 A | 6/1998 | Lubbers |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Philip Guyton
(74) *Attorney, Agent, or Firm* — Garlick & Markison; Timothy W. Markison; Timothy D. Taylor

(57) ABSTRACT

A method includes determining whether an encoded data slice (EDS) of an "x" number of EDSs associated with a set of EDSs requires rebuilding, where the "x" number of EDSs is stored in a set of storage units of the storage network and the encoded data slice is stored in a first storage unit of the set of storage units. When the encoded data slice requires rebuilding, the method continues by identifying one of a "z" number of EDSs to replace the encoded data slice, where the "z" number of EDSs are not currently stored in the set of storage units. The method continues by constructing the one of the "z" number of EDSs from a decode threshold number of EDSs of the "x" number of EDSs and sending the one of the "z" number of EDSs to a second storage unit of the set of storage units.

20 Claims, 14 Drawing Sheets

(56) References Cited

U.S. PATENT DOCUMENTS

| | | |
|---|---|---|
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,386,757 B2 | 6/2008 | Lindenstruth |
| 7,636,724 B2 | 12/2009 | De La Torre |
| 8,806,296 B1 | 8/2014 | Lazier |
| 9,558,067 B2 | 1/2017 | Resch et al. |
| 10,324,623 B2 | 6/2019 | Resch |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2010/0023524 A1 | 1/2010 | Gladwin |
| 2010/0269008 A1 | 10/2010 | Leggette |
| 2013/0132800 A1 | 5/2013 | Healey, Jr. |
| 2015/0154074 A1* | 6/2015 | Resch ............... G06F 16/00 714/764 |
| 2015/0254150 A1 | 9/2015 | Gordon |
| 2019/0250823 A1 | 8/2019 | Resch |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

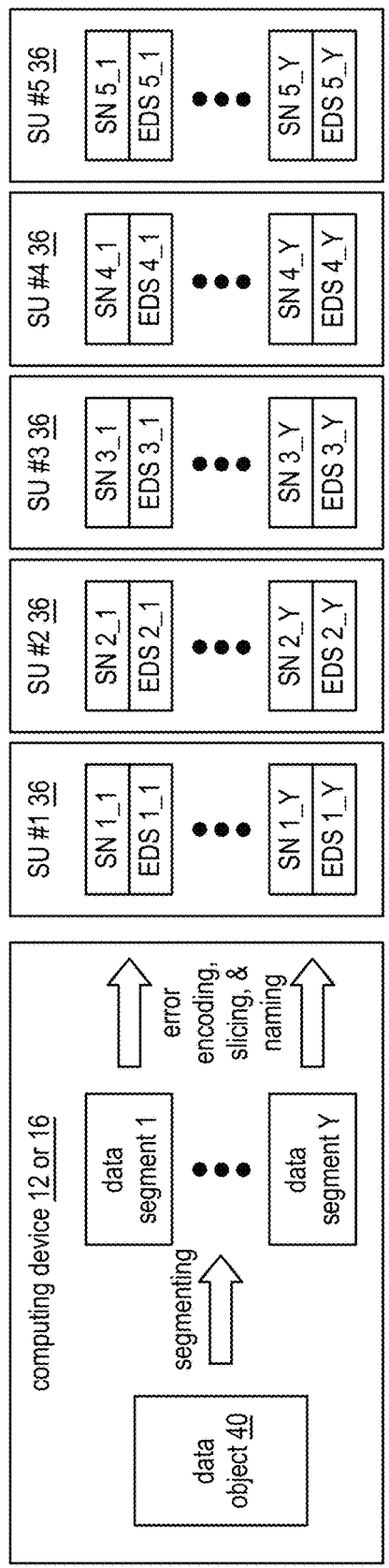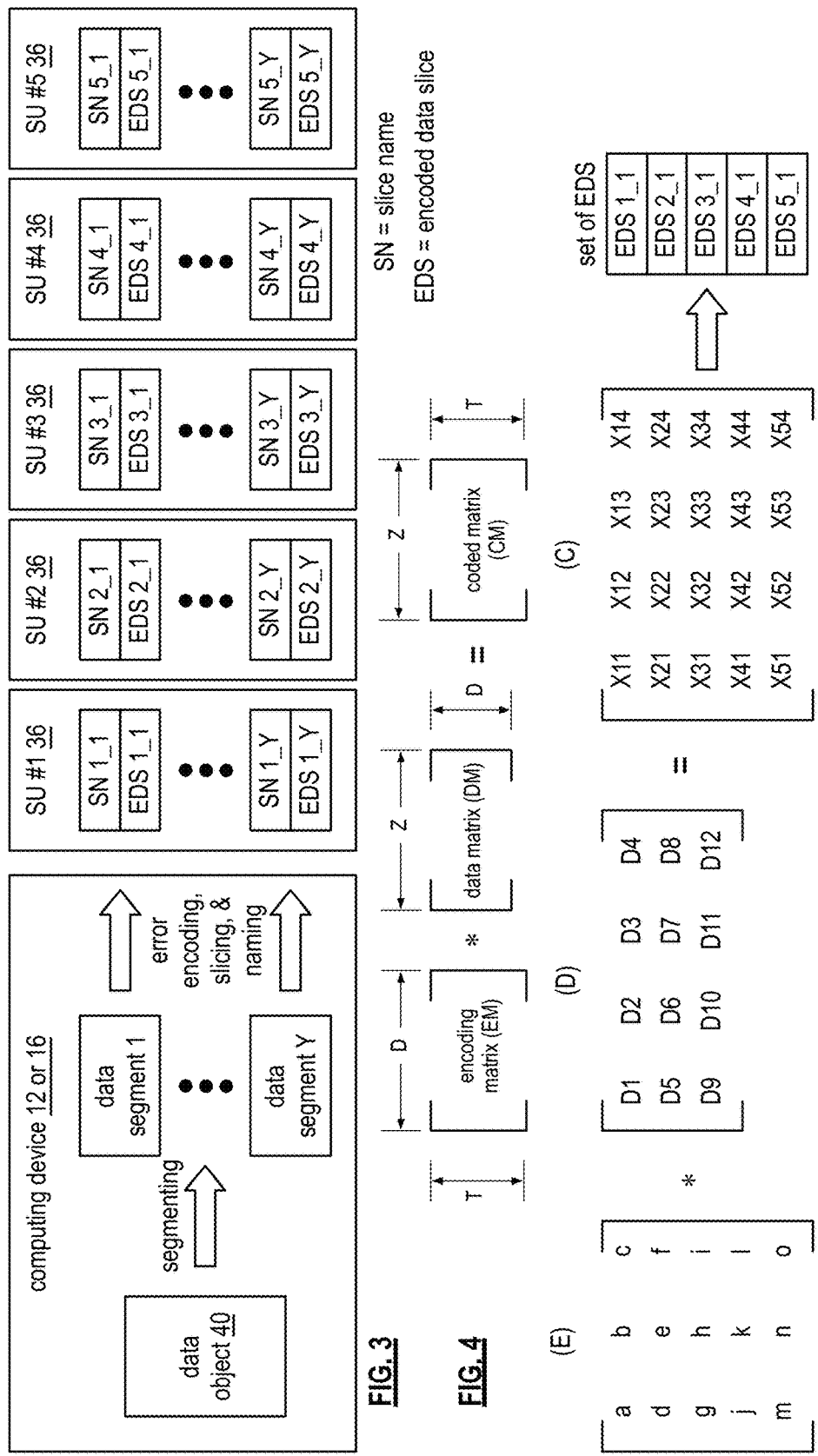
FIG. 3
FIG. 4
FIG. 5
FIG. 6

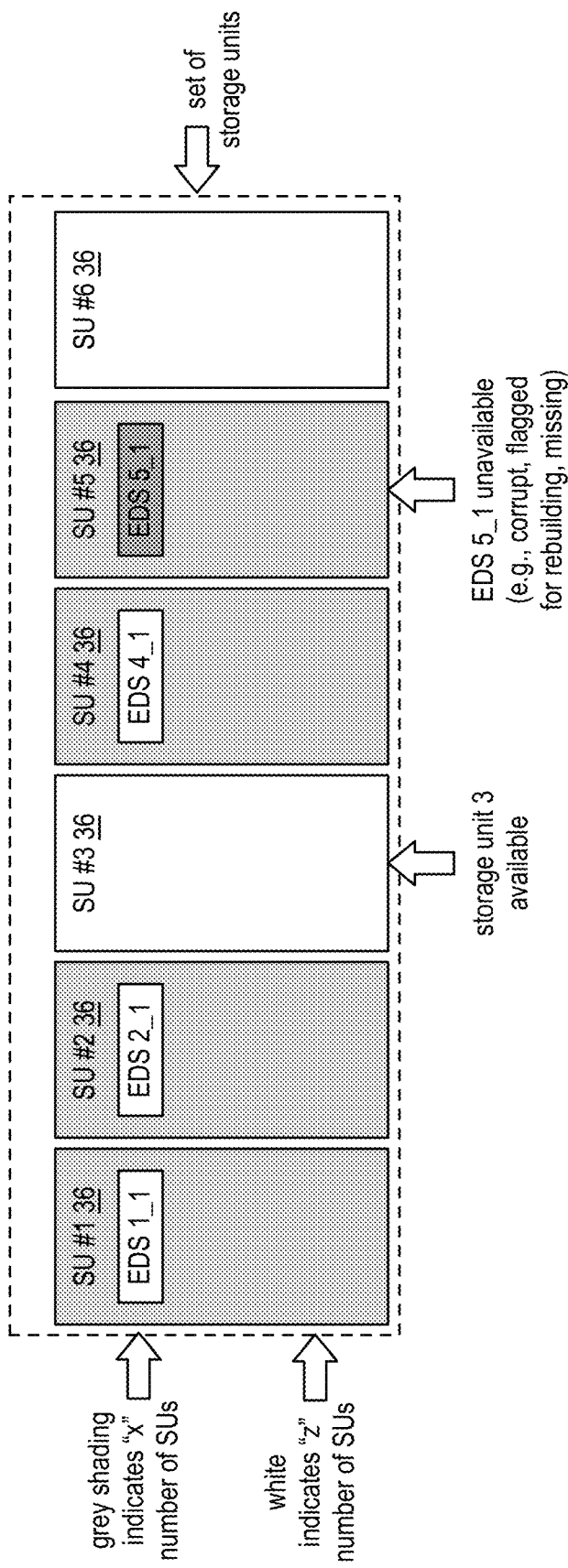

EFFICIENT REBUILDING OF AN ENCODED DATA SLICE

CROSS-REFERENCE TO RELATED APPLICATIONS

The present U.S. Utility Patent Application claims priority pursuant to 35 U.S.C. § 120 as a continuation of U.S. Utility application Ser. No. 16/396,399, entitled "EFFICIENT COMPUTATION OF ONLY THE REQUIRED SLICES," filed Apr. 26, 2019, which is a continuation-in-part of U.S. Utility application Ser. No. 15/405,004, entitled "MAPPING STORAGE OF DATA IN A DISPERSED STORAGE NETWORK," filed Jan. 12, 2017, issued as U.S. Pat. No. 10,324,623 on Jun. 18, 2019, which is a continuation of U.S. Utility application Ser. No. 14/088,897, entitled "MAPPING STORAGE OF DATA IN A DISPERSED STORAGE NETWORK," filed Nov. 25, 2013, issued as U.S. Pat. No. 9,558,067 on Jan. 31, 2017, which claims priority pursuant to 35 U.S.C. § 119(e) to U.S. Provisional Application No. 61/748,916, entitled "UTILIZING A HIERARCHICAL REGION HEADER OBJECT STRUCTURE FOR DATA STORAGE," filed Jan. 4, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to encoded data slices.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12A illustrates another specific example of Cauchy Reed-Solomon encoding in accordance with the present invention;

FIG. 12B illustrates a specific example of dispersed storage error encoding in accordance with the present invention;

FIG. 14 is a schematic block diagram of an example of determining to rebuild an encoded data slice in accordance with the present invention;

FIG. 15 illustrates another specific example of a dispersed storage error encoding process in accordance with the present invention;

DETAILED DESCRIPTION OF THE INVENTION

Figure 1:
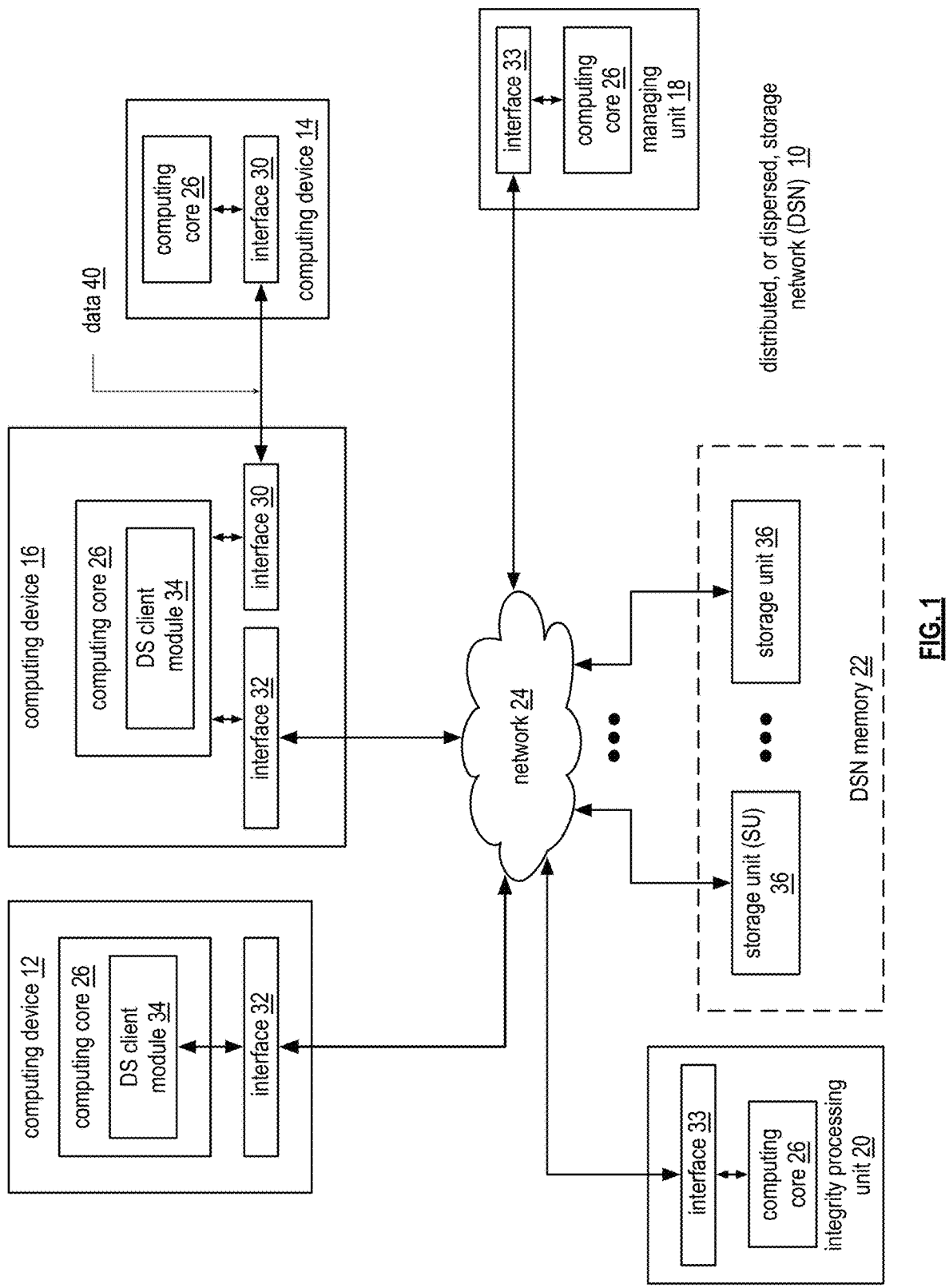
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
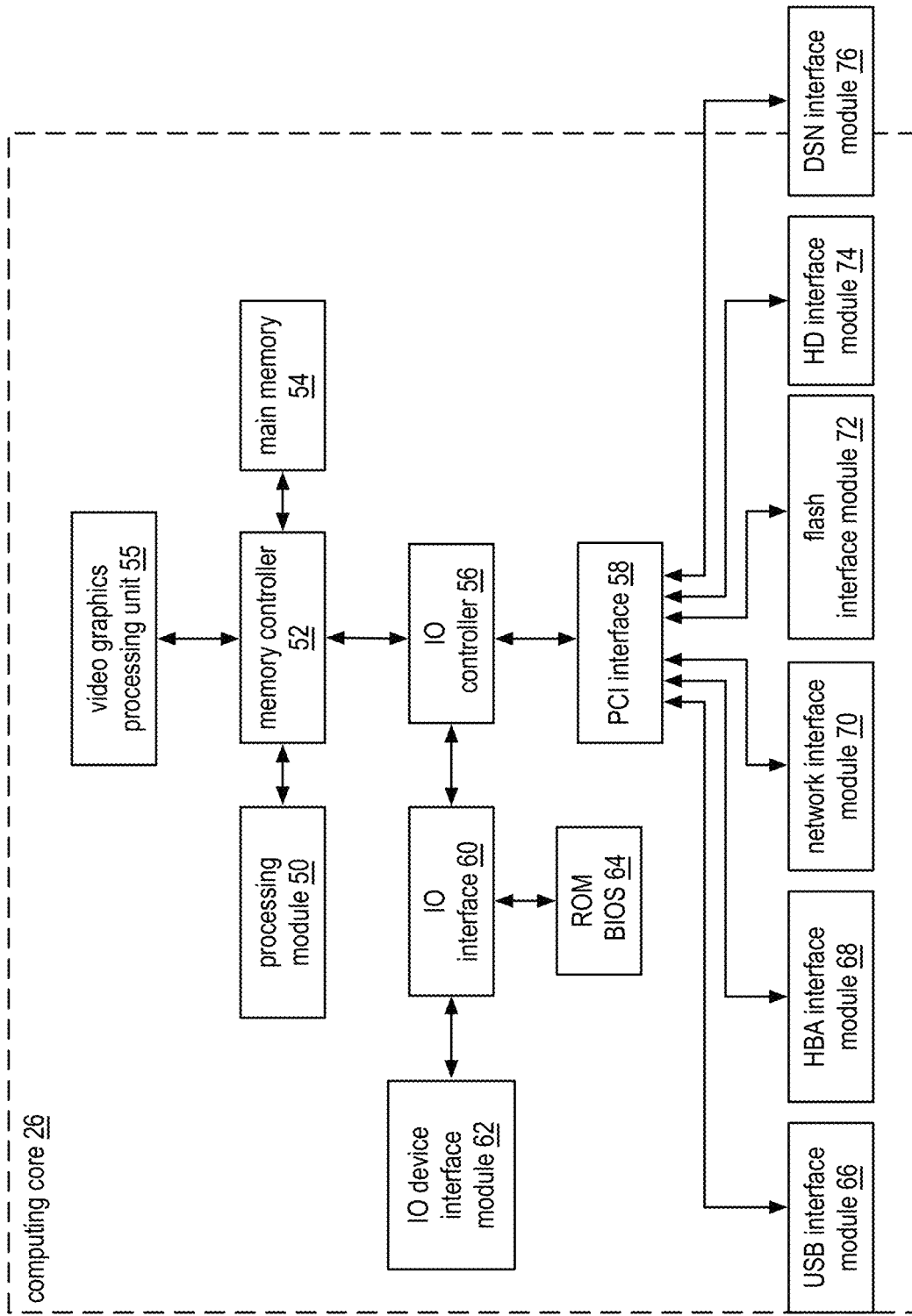
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data 40 on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN (distributed storage and task network) memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 78 is shown in FIG. 6. As shown, the slice name (SN) 78 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
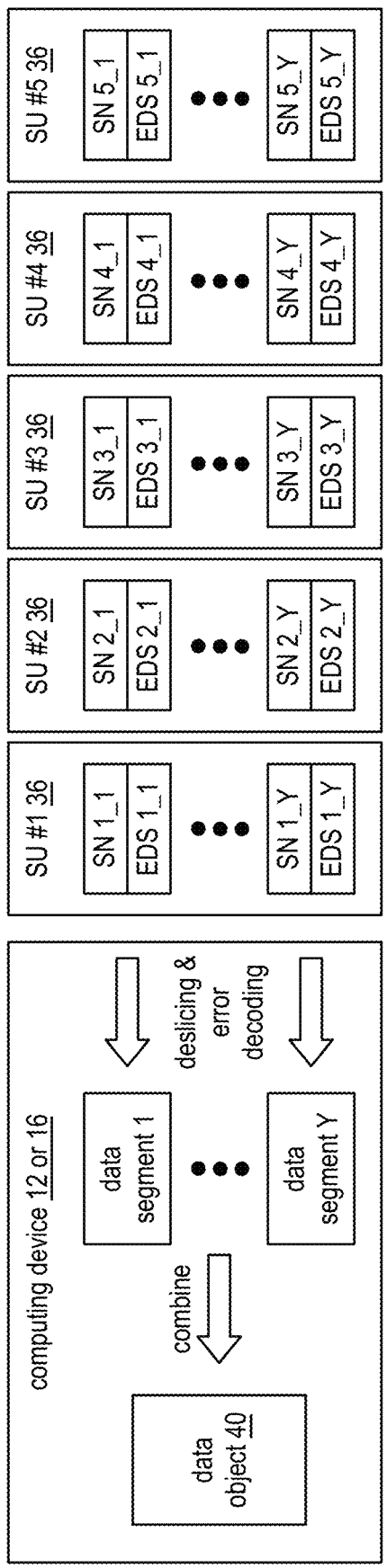
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
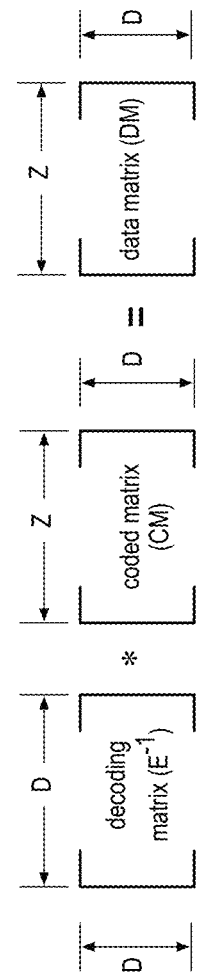
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
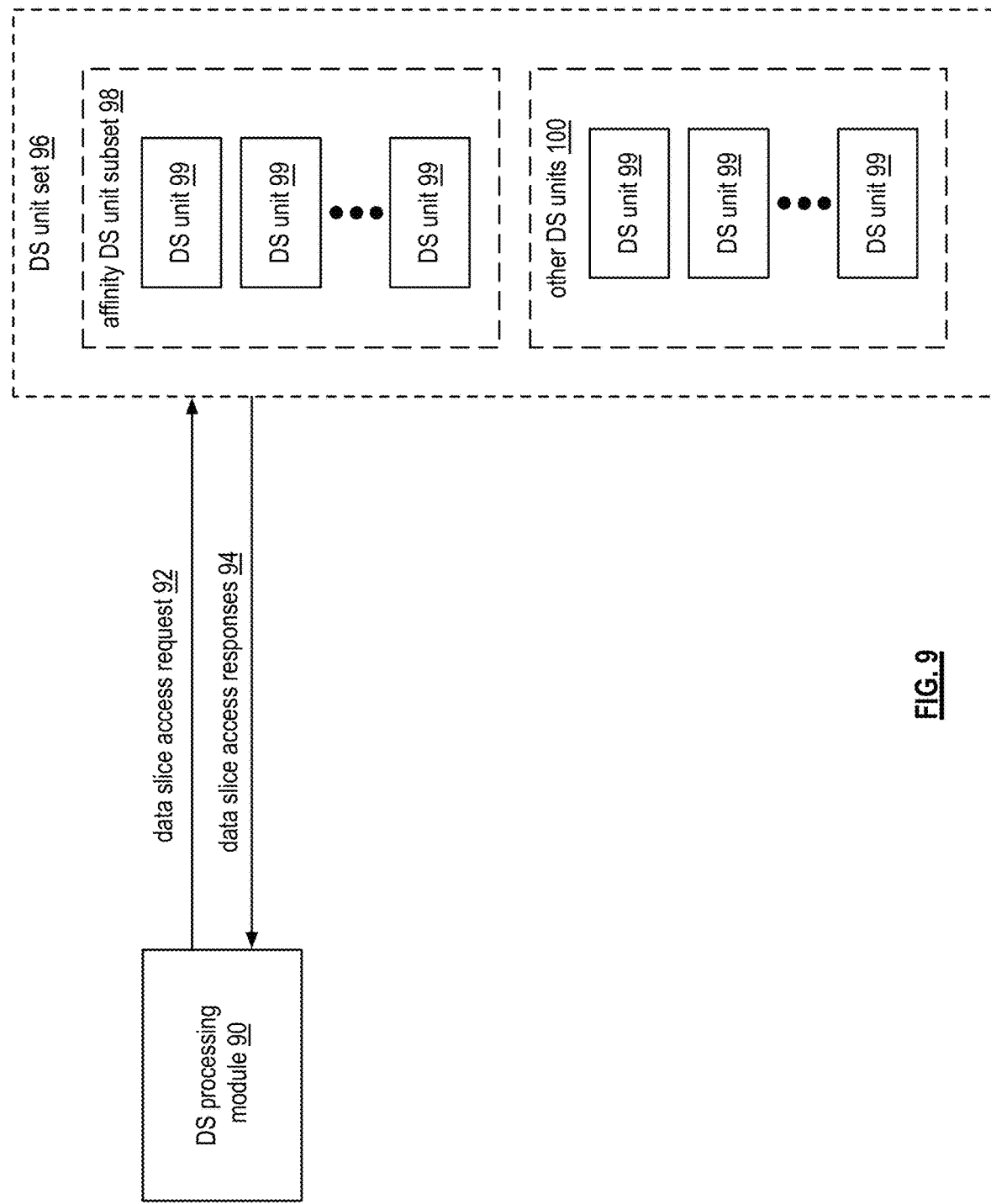
FIG. 9 is a schematic block diagram of another embodiment of a dispersed storage system in accordance with the present invention.

FIG. 9 is a schematic block diagram of another embodiment of a dispersed storage system that includes a dispersed storage (DS) processing module 90 and a DS unit set 96. The DS unit set 96 includes an affinity DS unit subset 98 and other DS units 100. The affinity DS unit subset 98 includes an affinity target number of DS units 99 where the affinity target number is less than a pillar width number. The other DS units 100 includes one or more DS units 99. Each DS unit 99 of DS unit set 96 may be implemented utilizing a storage unit, a storage server, a computing device and one or more memory devices. The DS processing module 90 may be implemented utilizing at least one of a DS client module, a distributed storage and task (DST) client module, a DST processing unit, a DS processing unit, a computing device, a user device, a DST execution unit, and a storage unit.

The system is operable to facilitate storing, rebuilding, and reading of data in the DS unit set 96. The affinity DS unit subset 98 is associated with a source name range of dispersed storage network (DSN) addresses which may include one or more source names. With regards to writing data, the DS processing module 90 encodes data for storage to produce an affinity target number of encoded data slices and outputs the affinity target number of encoded data slices (e.g., within an affinity target number of data slice access requests 92) to the affinity DS unit subset 98. The DS processing module 90 determines whether the encoded data slice of the affinity target number of encoded data slices was successfully stored in a corresponding DS unit 99 of the affinity DS unit subset 98 based on the preceding an affinity target number of data slice access responses 94 (e.g., responses indicate successfully stored or not). When the DS processing unit 90 detects that storage of the affinity target number of encoded data slices is not successful, the DS processing module 90 encodes the data to produce one or more other encoded data slices (e.g., corresponding to different pillar numbers than the affinity target number of encoded data slices) and outputs the one or more other encoded data slices to one or more DS units of the other DS units.

With regards to rebuilding data, the DS processing module 90 determines whether a slice error exists within a DS unit 99 of the affinity DS unit subset 98 and facilitates rebuilding of the slice error to restore a corresponding encoded data slice within the DS unit 99 of the affinity DS unit subset 98. When the DS processing module 90 determines that no slice errors exists within the affinity DS unit subset 98 and at least the affinity target number of encoded data slices exist for each data segment within the affinity DS unit subset, the DS processing module 90 determines whether any other encoded data slices (e.g., of other pillars) exist that are stored in the other DS units 100 that are associated with (e.g., common data segments) the encoded data slices of the affinity DS units 98. When the other encoded data slices exist, the DS processing module 90 facilitates deletion of the other encoded data slices. For example, the DS processing module 90 issues a delete data slice access request 92 for another encoded data slice stored at a corresponding DS unit 99 of the other DS units 100.

With regards to the reading of data, the DS processing module 90, for each data segment of the plurality of data segments of the data, issues a read threshold number of read data slice access requests 92 to the affinity DS unit subset 98. The read threshold is greater than or equal to a decode threshold and is less than or equal to the affinity target number. In response, the DS processing module 90 receives read data slice access responses 94 from the affinity DS unit subset 98. For each data segment, when not receiving at least a decode threshold number of encoded data slices within a reception timeframe, the DS processing module 90 issues additional read requests 92 to at least some of the other DS units 100 to facilitate receiving the decode threshold number of encoded data slices in total.

Figure 10:
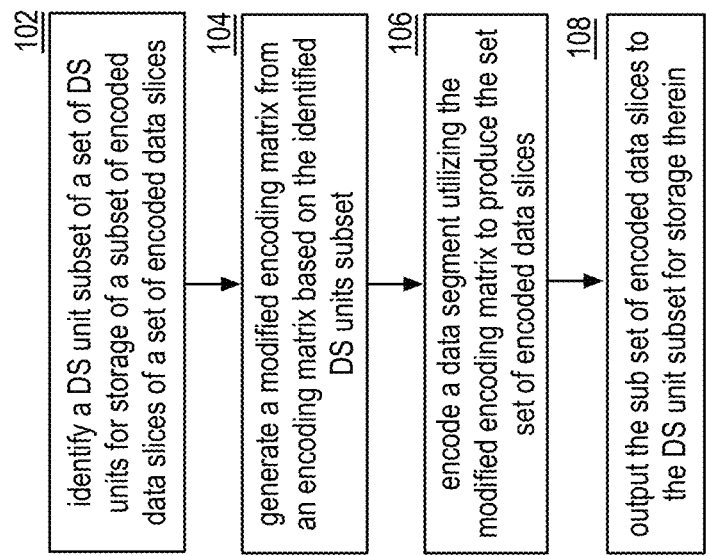
FIG. 10 is a flowchart illustrating an example of storing data in accordance with the present invention.

FIG. 10 is a flowchart illustrating another example of storing data. The method begins with step 102, where a processing module (e.g., of a dispersed storage (DS) processing module) identifies a DS unit subset of a set of DS units for storage of a subset of encoded data slices of a set of encoded data slices. The identifying may be based on one or more of a storage pattern, a dispersed storage error coding parameters, a dispersed storage error coding function, a predetermination, a request, a failure message, a DS unit availability indicator, and a reliability requirement. For example, the processing module identifies a DS unit subset that includes 12 DS units when the set of DS units includes 16 DS units, a decode threshold is 10, and a write threshold is 12.

The method continues at step 104, where the processing module generates a modified encoding matrix from an encoding matrix based on the identified DS unit subset. For example, the processing module matches rows of the encoding matrix that correspond to slices mapped to the DS unit subset. For example, the processing module includes rows 1-10, 14, and 15 when the DS unit subset includes DS units 1-10, 14, and 15. The method continues at step 106 where the processing module encodes a data segment utilizing the modified encoding matrix to produce the subset of encoded data slices. For example, the processing module matrix multiplies the data segment by the modified encoding matrix to produce the subset of encoded data slices. The method continues at step 108, where the processing module outputs the subset of encoded data slices to the DS unit subset for storage therein. The outputting includes generating a sub-set of slice names, generating a sub-set of write slice requests that includes the sub-set of slice names and the sub-set of encoded data slices, and outputting the sub-set of write slice requests to the DS unit subset.

Figure 11:
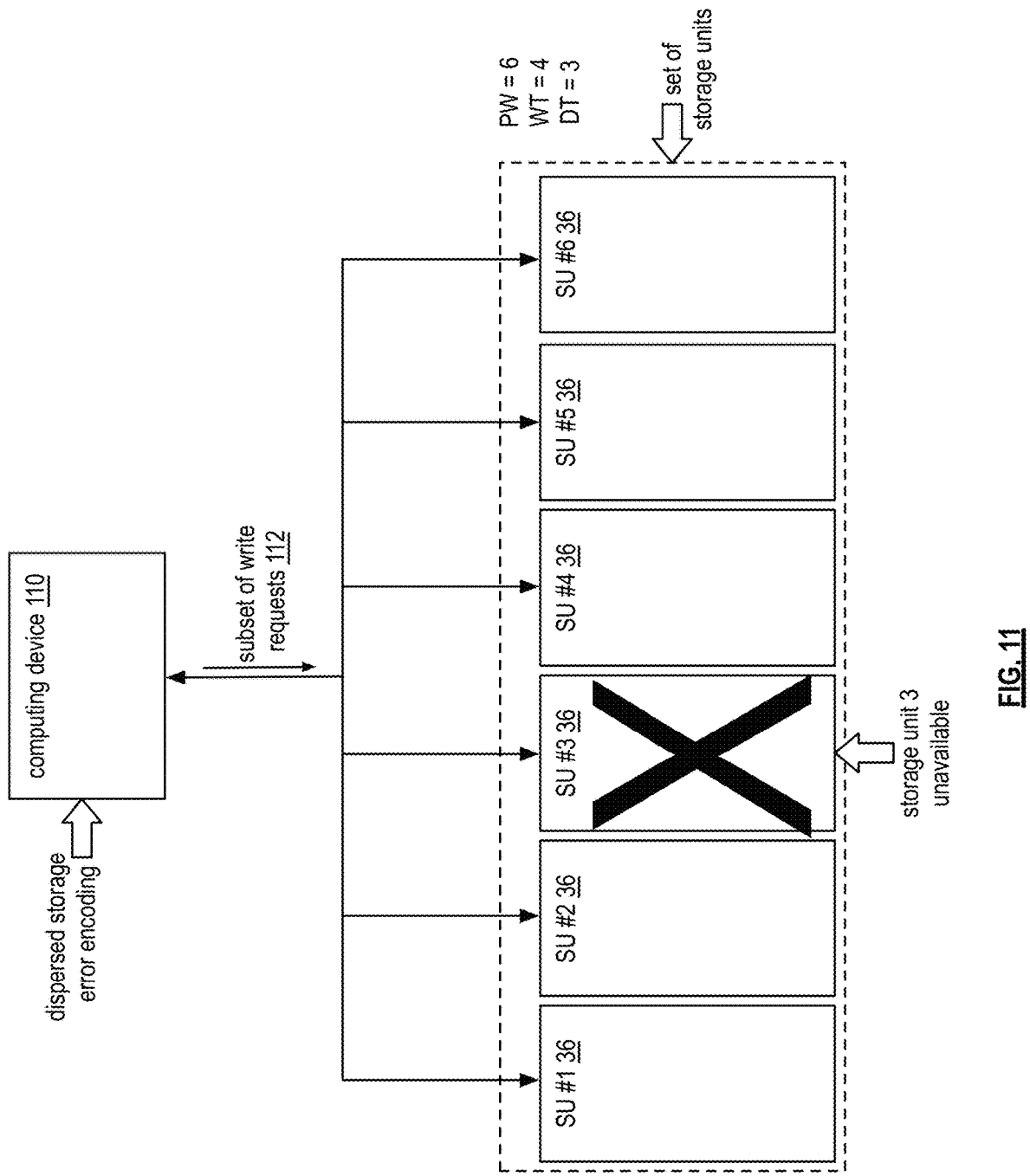
FIG. 11 is a schematic block diagram of another embodiment of a dispersed storage system in accordance with the present invention.

FIG. 11 is a schematic block diagram of another embodiment of a dispersed storage system or network that includes a computing device 110 and a set of storage units 36. The computing device 110 may be implemented by a DS processing module 90 of FIG. 9, one or more of the computing devices 12-16, the managing unit 18, the storage unit 36, and the integrity processing unit 20 of FIG. 1. Each storage unit 36 may be implemented utilizing a storage server, a computing device and one or more memory devices.

In this example, there are six storage units #1-#6 36. Further in this example, dispersed data storage parameters for the dispersed storage error encoding of a data segment of data include a pillar width (PW) number of 6, a write threshold (WT) number of 4, and a decode threshold (DT) of 3. Note in other embodiments the dispersed data storage parameters may be different. As one example, the dispersed data storage parameters include: PW=16, WT=12, and DT=10. As another example, the dispersed data storage parameters include: PW=256, WT=192, and DT=144.

In an example of operation, the computing device 110 obtains a data segment of the data for storage in the set of storage units 36. The computing device determines to create a subset of encoded data slices based on one or more of an available number of storage units of the set of storage units and the dispersed data storage parameters. For example, the computing device determines storage units 1, 2, 4, 5, and 6 are available and determines the pillar width is 6, the write threshold is 4, and the decode threshold is 3. Thus, the computing device determines to create a subset of 4 encoded data slices (e.g., at least the write threshold number).

Note the computing device may also determine to produce 5 encoded data slices (e.g., when greater reliability is desired, based on a DSN policy, based on a command, etc.). Further note, the computing device does not determine to produce 6 encoded data slices (EDSs) due the storage unit #3 36 being unavailable (e.g., the computing device cannot write the encoded data slice to storage unit #3). By producing less than the pillar width number of encoded data slices (e.g., 4 or 5 EDSs instead of 6), the computing device decreases processing costs associated with the creation of the one or two additional encoded data slices. Further, storage units' input/output and storage costs associated with writes, reads, and storage of the additional encoded data slices are decreased.

Having determined the number of the subset of encoded data slices, the computing device selects from the available storage units of the set of storage units to store the subset of encoded data slices. In one example, the selection is based on selecting the storage units that are within a same performance range. For example, the computing device selects storage units 1, 3, 5, and 6 as a subset of storage units to store the subset of encoded data slices, when storage units 1, –3, 5, and 6 are within a first performance range (e.g., processing speed within 10% range of each other). In another example, the selection is based on selecting the storage units that have a highest reliability score. For example, the computing device selects storage units 1, 2, 3, and 5 as a subset of storage units to store the subset of encoded data slices when storage units 1, 2, 3, and 5 have the highest reliability scores of the available storage units.

In this example, the computing device determines the subset of storage units includes storage units #1, #2, #4 and #5 36. Having selected the subset of storage units, the computing devices dispersed storage error encodes the data segment to produce the subset of encoded data slices. The computing device then sends a subset of write requests 112 that include the subset of encoded data slices to the subset of storage units for storage therein. The dispersed storage error encoding to produce the subset of encoded data slices is discussed in further detail with reference to FIGS. 12-20.

Figures 12A, 12B:
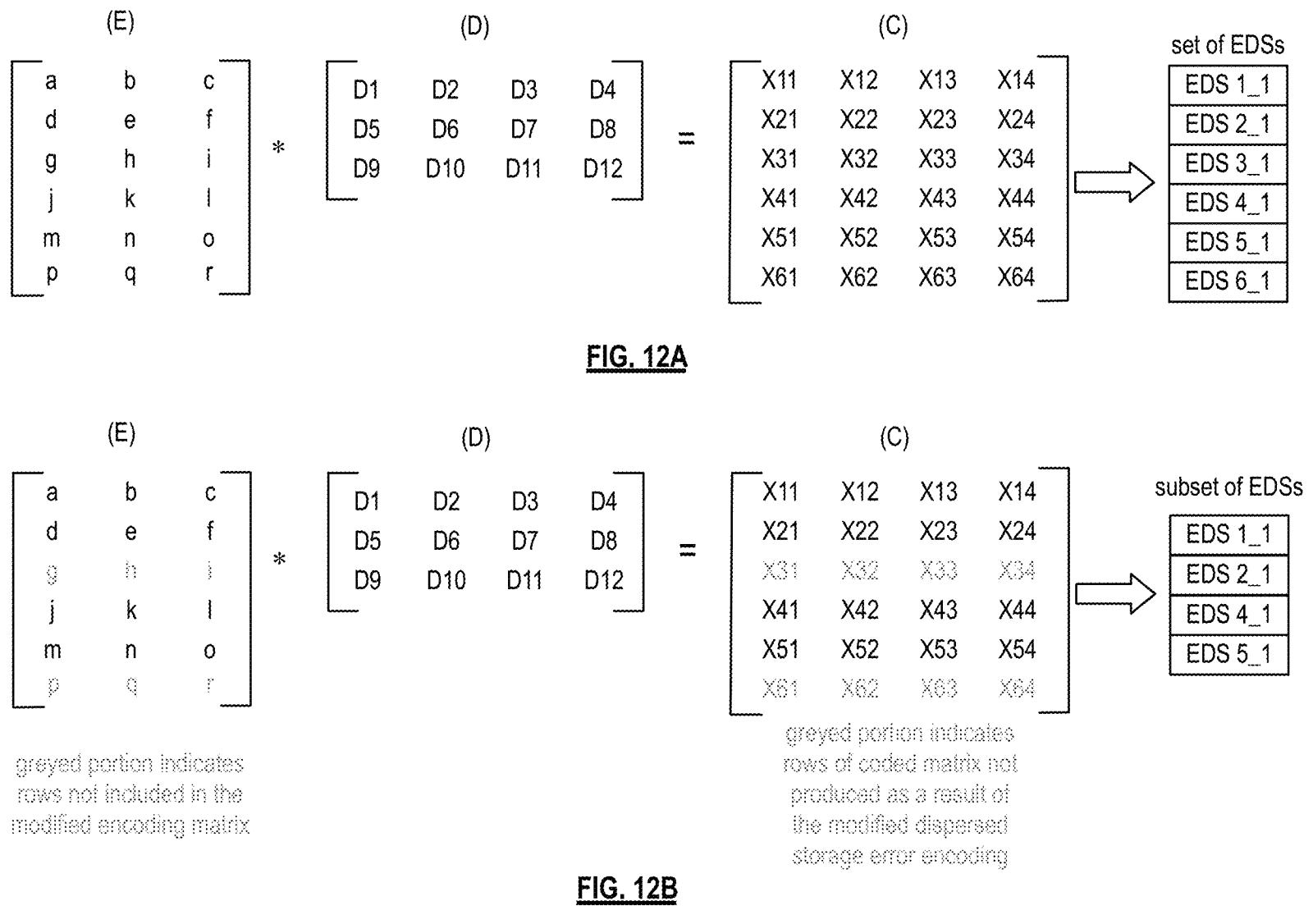

FIG. 12A illustrates another specific example of Cauchy Reed-Solomon encoding with a pillar width number of six and decode threshold number of three. This example is similar to FIG. 5, with the encoding matrix including an additional row (e.g., coefficients p, q, and r). In this example of generating a pillar width number (e.g., 6) of encoded data slices, the encoding matrix (6 rows, 3 columns), is matrix multiplied with a data matrix (3 rows, 4 columns) to produce a coded matrix (6 rows, 4 columns). Each row of the coded matrix produces a corresponding encoded data slice of a set of encoded data slices (e.g., EDS 1_1 through EDS 6_1).

FIG. 12B illustrates another specific example of dispersed storage error encoding with the pillar width number of six and the decode threshold number of three. This example relates to the example of the dispersed storage system shown in FIG. 11, where a computing device has determined to include 4 encoded data slices in a subset of encoded data slices for storage in storage units 1, 2, 4, and 5.

Having selected storage units 1, 2, 4, and 5, the computing device determines to create encoded data slices EDS 1_1, EDS 2_1, EDS 4_1, and EDS 5_1 as the subset of encoded data slices. The computing device obtains an encoding matrix (E) and selects rows corresponding to the subset of encoded data slices (e.g., the first, second, fourth and fifth) to produce a modified matrix. The computing device obtains a data matrix (e.g., arranges the data segment into coded blocks) and matrix multiplies the modified matrix with the data matrix to produce the subset of encoded data slices EDS 1_1, EDS 2_1, EDS 4_1, and EDS 5_1.

Figure 13:
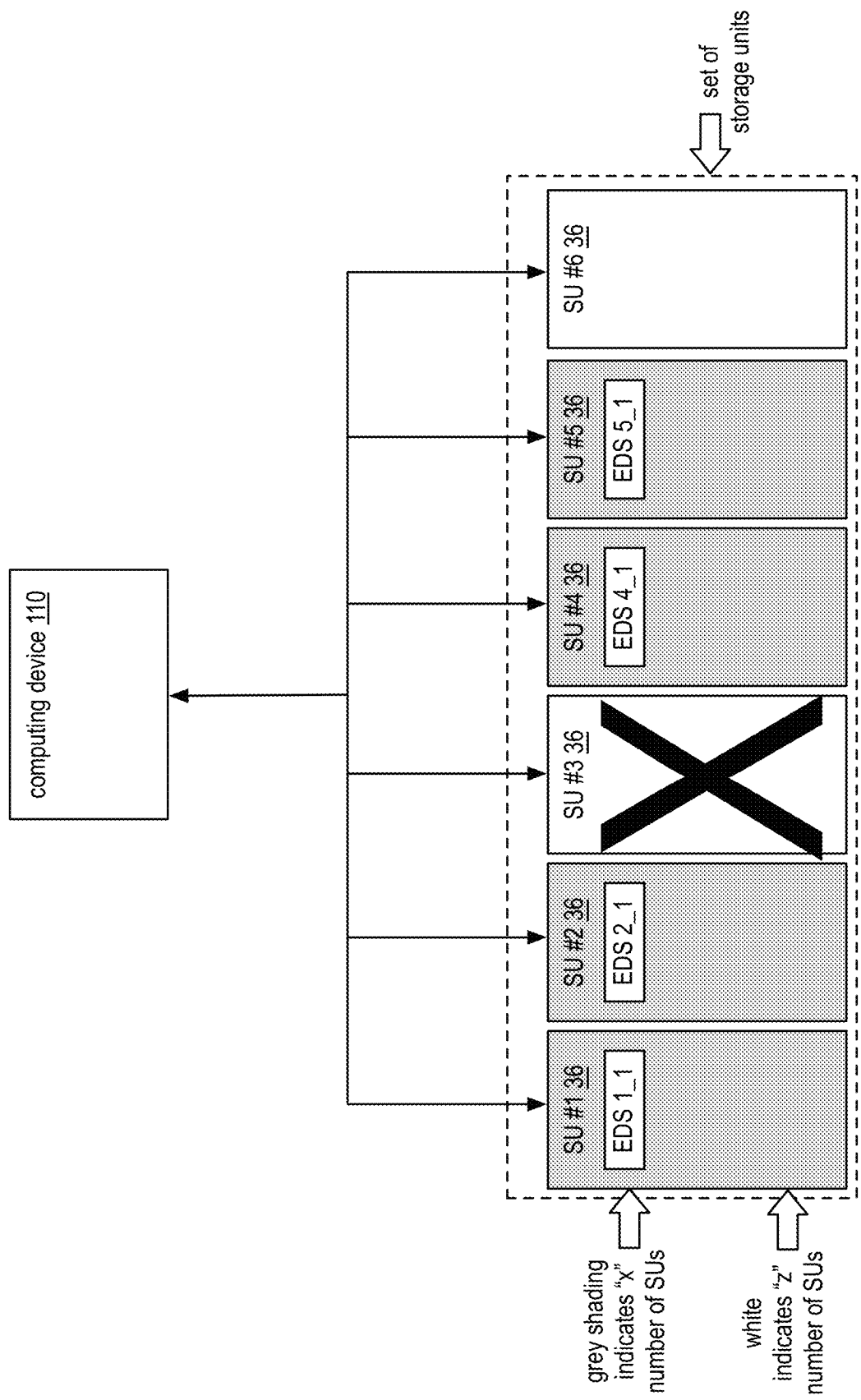
FIG. 13 is a schematic block diagram of another embodiment of a dispersed storage system in accordance with the present invention.

FIG. 13 is a schematic block diagram of another embodiment of a dispersed storage system or network that includes the computing device 110 and the set of storage units 36. The computing device 110 may be implemented by a DS processing module 90 of FIG. 9, one or more of the computing devices 12-16, the managing unit 18, the storage unit 36, and the integrity processing unit 20 of FIG. 1. Each storage unit 36 may be implemented utilizing a storage server, a computing device and one or more memory devices.

Continuing with the example of operation of FIG. 12B, the subset of storage units (e.g., a "x" number of storage units (e.g., shown with grey shading)) store the subset of encoded data slices EDS 1_1, EDS 2_1, EDS 4_1, and EDS 5_1 and other (e.g., storage units #3 and #6) storage units 36 (e.g., a "z" number of storage units (e.g., shown without shading)) do not store any encoded data slices of the set of encoded data slices (e.g., EDS 3_1, EDS 6_1).

The "x" number of storage units are storage units that are currently storing an encoded data slice of the set of encoded data slices. As an example of determining the "x" number, the computing device sends a subset of list requests to the subset of storage units. The computing device then receives at least some list responses from the subset of storage units indicating whether a corresponding encoded data slice is stored therein. For example, the computing device receives list responses from storage units 1, 2, 4, and 5 that they are storing encoded data slices EDS 1_1, EDS 2_1, EDS 4_1, and EDS 5_1. Thus, the computing device determines the "x" number is 4. Note as more or less encoded data slices are stored in the pillar width number of storage units, the "x" number will change (e.g., decrease, increase).

Further note a target "x" number may be initially generated by obtaining the write threshold number and identifying an available number of storage units of the pillar width number of storage units, wherein the available number of storage units is greater than or equal to the write threshold number. The computing device then determines the target "x" number based on the available number of storage units, the write threshold number and the pillar width number. For example, the computing device determines the WT is 4, the PT is 6 and the available number of storage units is 5 and determines the target "x" number is 4. When the available number of storage units is less than the write threshold number, the computing device may determine to add additional storage units to the set of storage units, may determine to forego a rebuilding process and/or may determine other storage units for which to temporarily store additional encoded data slices of the set of encoded data slices. Note the target "x" number may be changed based on one or more of a desired reliability and a desired system performance.

The "z" number of storage units indicates the number of storage units in the set of storage units not currently storing an encoded data slice of the set of encoded data slices. In some examples, the "z" number includes storage units that are currently unavailable. In this specific example, the "z" number of storage units is 2 and includes storage units 3 and 6, which have logical addresses (e.g., a DSN address range, a slice name range, etc.) related to encoded data slices (EDS 3_1 and EDS 6_1) of the set of encoded data slices that are not currently stored.

For example, a DSN address of encoded data slice 3 falls within an address range that is mapped to the storage unit 3 and a DSN address of encoded data slice 6 falls within an address range that is mapped to the storage unit 6. Note the "x" and "z" number may change from a first time to a second time. For example, when a storage unit is replaced and no longer stores an encoded data slice of the set of encoded data slices, the storage unit would move from the "x" number to the "z" number. Note the "z" number may be changed based on one or more of a desired reliability and a desired system performance (e.g., by adding an additional storage unit to the pillar width number of storage units, changing the pillar width number, etc.).

As another example, when a storage unit is unavailable, the storage unit may move from the "x" number to a "t" number (e.g., shown with an "X" in FIG. 13), where the "t" number indicates a storage unit that is in a transition (e.g., unavailable due to a maintenance schedule, offline, no longer in use, etc.), and the encoded data slice may be stored, but is not currently accessible. Alternatively, the "t" number is included in the "z" number. Further alternatively, the "t" number is included in the "x" number until the storage unit is determined to no longer store the encoded data slice (e.g., has been replaced, longer than a time period has elapsed without a slice list response indicating the encoded data slice is stored, etc.).

FIG. 14 is a schematic block diagram of an example of determining to rebuild an encoded data slice stored in the set of storage units 36. Each storage unit 36 may be implemented utilizing a storage server, a computing device and one or more memory devices.

Continuing with the example of operation of FIG. 13, storage unit 3 is now available (e.g., back online, has been updated, has been upgraded, has been replaced, etc.) and encoded data slice EDS 5_1 is unavailable (e.g., corrupt, missing, flagged for rebuilding, storage unit #5 is in scheduled maintenance, storage unit #5 is unavailable, etc.). In one example, when the encoded data slice EDS 5_1 is unavailable, this indicates an issue with storage unit #5. For example, the issue is storage unit #5 is in scheduled maintenance. As another example, the issue is storage unit #5 has failed. As yet another example, the issue is storage unit #5 is experiencing performance and/or data degradation. As yet another example, the issue is storage unit #5 is scheduled to be replaced. Therefore, when the EDS 5_1 is unavailable and/or the storage unit is experiencing the issue, the computing device determines to rebuild encoded data slice 5_1 by producing another encoded data slice (e.g., one of the "z" number of encoded data slices).

The computing device makes this determination due to it not always being optimal to reproduce EDS 5_1. For example, when the storage unit #5 is scheduled to be replaced, then rebuilding encoded data slice 5_1 may only be beneficial from the time the encoded data slice is rebuilt and stored to the time when the storage unit is replaced. As another example, when the storage unit #5 is experiencing performance degradation (e.g., processing speed is below a threshold, input/output speed is greater than a threshold difference of other storage units in the subset of storage units) rebuilding EDS 5_1 will slow (e.g., decrease by the threshold difference, decrease by an order of magnitude, etc) subsequent data access requests to the set of storage units that include encoded data slice EDS 5_1.

Having determined to rebuild EDS 5_1, the computing device identifies at least one of the "z" number of encoded data slices (e.g., EDS 3_1, EDS 6_1) to produce to replace the encoded data slice that needs rebuilding (e.g., the encoded data slice EDS 5_1 with the issue). For example, the computing device identifies encoded data slices EDS 3_1, EDS 6_1 as not being currently stored in the set of storage units. The computing device determines whether to rebuild one or both of the identified encoded data slices.

The determining whether to produce (e.g., generate, receive) one or more of the identified "z" encoded data slices is based on one or more of a predetermination, a command, a lookup, a DSN policy, and the dispersed data storage parameters. For example, the computing device determines to generate all identified encoded data slices EDS 3_1 and EDS 6_1 of the "z" number of encoded data slices when the DSN policy indicates to generate at least one extra encoded data slice for a rebuilding process. As another example, the computing device determines to produce one encoded data slice of encoded data slices EDS 3_1 and EDS 6_1 of the "z" number of encoded data slices when the dispersed data storage parameters indicate to at least maintain a write threshold of 4 and only 3 encoded data slices are currently stored and available.

When determining to not produce all of the "z" encoded data slices, the computing device determines which encoded data slices of the encoded data slices EDS 3_1 and EDS 6_1 to produce to rebuild EDS 5_1. As one example, the computing device determines to produce a respective encoded data slice of the "z" number of encoded data slices by determining which of the storage units have been recently restored. For example, when storage unit #3 is available due to being recently restored, and is more recently restored than storage unit #6, the computing device determines to produce the respective encoded data slice (e.g., EDS 3_1) that is mapped to be stored in storage unit #3.

As another example, the computing device determines to produce a respective encoded data slice of the "z" number of encoded data slices by determining which of the storage units have been recently upgraded. For example, the computing device determines storage unit #6 was upgraded more recently than storage unit #3. Thus, the computing device determines to generate the respective encoded data slice (e.g., EDS 6_1) that is mapped to be stored in storage unit #6.

As yet another example, the computing device determines to produce a respective encoded data slice of the "z" number of encoded data slices by determining a storage unit has not been used previously for the set of encoded data slices (e.g., EDS 3_1, EDS 6_1, increasing the pillar width and producing an encoded data slice EDS 7_1, etc.). As yet still another example, the computing device determines to produce a respective encoded data slice of the "z" number of encoded data slices by determining the storage unit (e.g., storage unit #3) is within a performance range (e.g., a threshold difference, 5%, an order of magnitude difference, etc.) of other storage units in the "x" number of storage units (e.g., storage units #1, #2, #4, and #5).

FIG. 15 illustrates another specific example of a dispersed storage error encoding process that includes the pillar width number of six and the decode threshold number of three. This example relates to the dispersed storage system shown in FIGS. 11-14, where a computing device has determined to rebuild encoded data slice 5_1 by producing encoded data slice 3_1 for storage in storage unit #3 36.

Continuing with the example of operation of FIG. 14, the computing device obtains the encoding matrix and selects the row (e.g., the third (e.g., coefficients g, h, i)) of the encoding matrix corresponding to EDS 3_1. The computing device obtains the data matrix and matrix multiplies the selected row of the encoding matrix with the data matrix to produce EDS 3_1.

Figure 16:
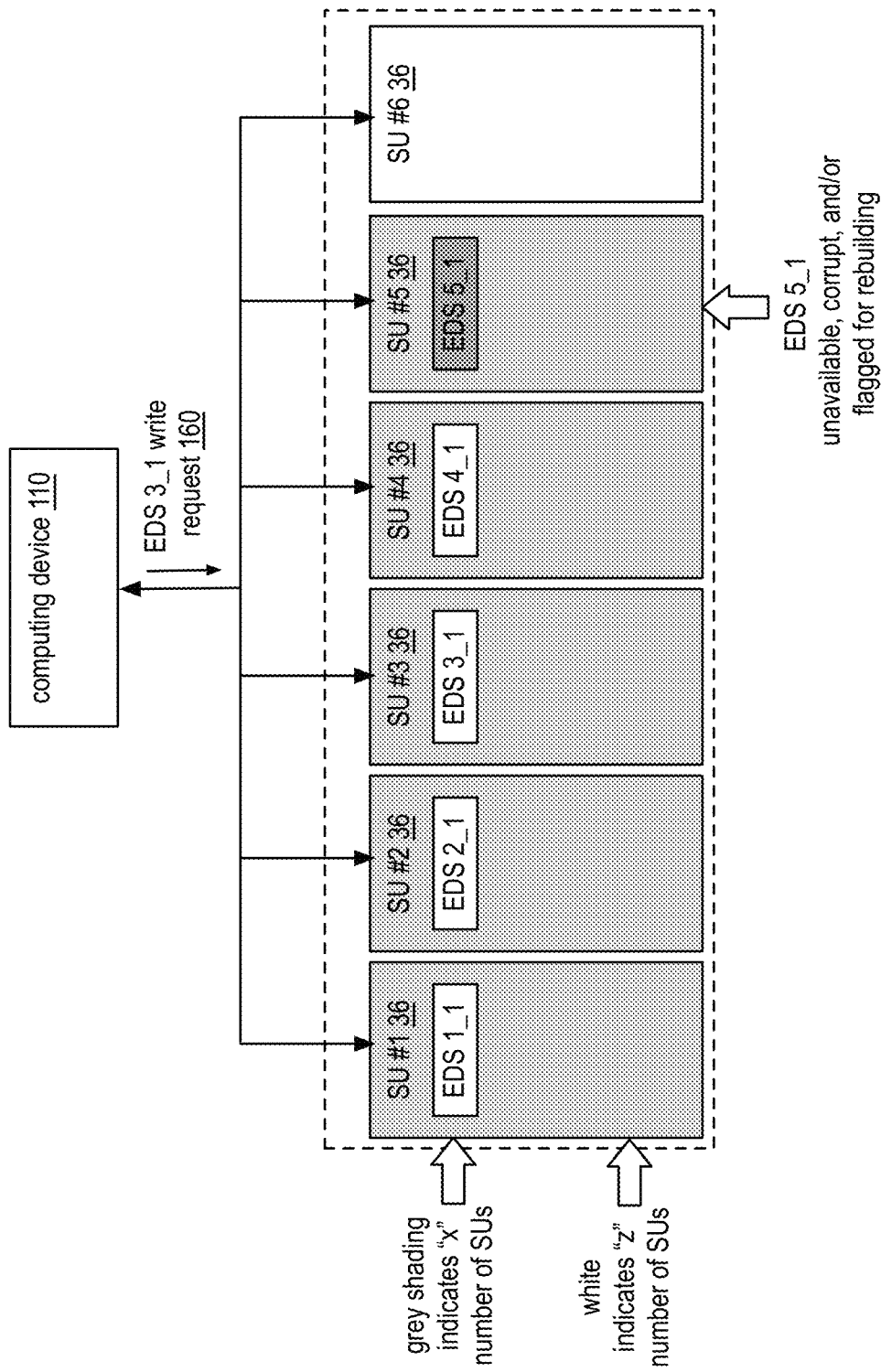
FIG. 16 is a schematic block diagram of another embodiment of a dispersed storage system in accordance with the present invention.

FIG. 16 is a schematic block diagram of another embodiment of a dispersed storage system or network that includes the computing device 110 and the set of storage units 36. The computing device 110 may be implemented by a DS processing module 90 of FIG. 9, one or more of the computing devices 12-16, the managing unit 18, the storage unit 36, and the integrity processing unit 20 of FIG. 1. Each storage unit 36 may be implemented utilizing a storage server, a computing device and one or more memory devices.

Continuing with the example of operation of FIG. 15, the computing device sends a write request 160 to storage unit #3 that includes the encoded data slice EDS 3_1 for storage therein. At this time, the set of storage units is storing encoded data slices EDS 1_1-EDS 4_1, and encoded data slice 5_1 has been identified to have an issue (e.g., unavailable, corrupt, flagged for rebuilding, etc.). In this example, the computing device determines that no new encoded data slice needs to be generated (e.g., the set of storage units are storing at least the write threshold number of encoded data slices). Note the determining may be based on one or more of a predetermination, a command, a lookup, a DSN policy, and the dispersed data storage parameters.

Figure 17:
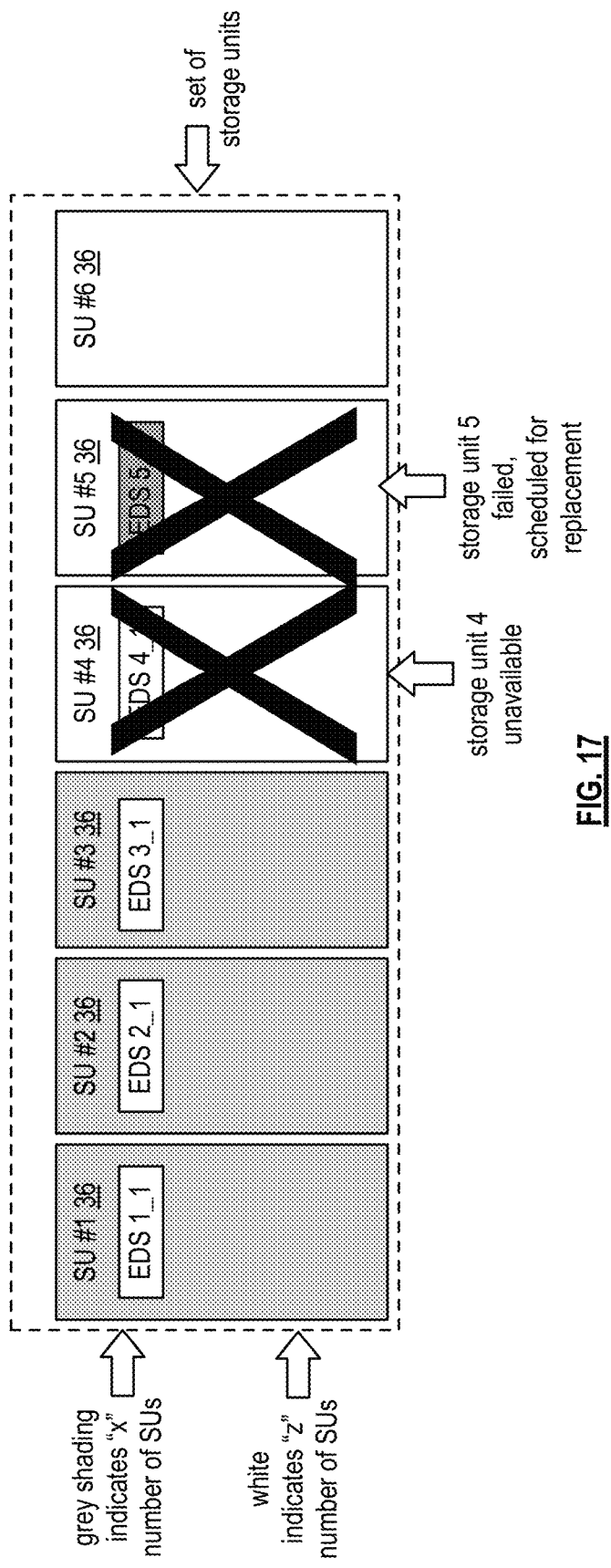
FIG. 17 is a schematic block diagram of another example of determining to rebuild an encoded data slice in accordance with the present invention.

FIG. 17 is a schematic block diagram of another example of determining to rebuild an encoded data slice of the set of encoded data slices stored in the set of storage units 36. Each storage unit 36 may be implemented utilizing a storage server, a computing device and one or more memory devices.

Continuing with the example of operation of FIG. 16, storage unit #4 is now unavailable (resulting in EDS 4_1 being unavailable) and storage unit #5 has failed and is scheduled for replacement. As such, the computing device determines to rebuild at least one of the encoded data slices EDS 4_1 and EDS 5_1. In one example, when the computing device determines to rebuild more encoded data slices than there are available storage units (e.g., EDS 4_1 and EDS 5_1>. SU #6), the computing device may store more than one encoded data slice in a storage unit. For example, the computing device determines to generate another encoded data slice n_1 of the "z" number of encoded data slices in storage unit #3 (which also stores EDS 3_1). In another example, when the computing device determines to generate more encoded data slices than there are available storage units, the computing device may determine to add an additional one or more storage units to the set of storage units (e.g., add a seventh storage unit #7 36 to the set of storage units).

Having determined to rebuild an encoded data slice, the computing device identifies one of the "z" number of encoded data slices of the set of encoded data slices to replace the encoded data slice. In this example, the one of the "z" number of encoded data slices is encoded data slice EDS 6_1. Note if in the above example, the storage unit set is expanding to include the seventh storage unit, the one of the "z" number of encoded data slices could also be encoded data slice EDS 7_1.

Having determined the encoded data slice EDS 6_1 is the one of the "z" number of encoded data slices, the computing device determines to rebuild EDS 5_1 (e.g., based on being an oldest unavailable EDS, based on a command, etc.) by producing encoded data slice EDS 6_1. The producing process is discussed in further detail with reference to FIG. 18. Alternatively, the computing device determines to rebuild EDS 4_1 (e.g., due to EDS 5_1 already "rebuilt", due to a command, due to a DSN policy, etc.) by producing encoded data slice EDS 6_1. Note in this specific example, the "z" number is three and the "x" number is three.

Figure 18:
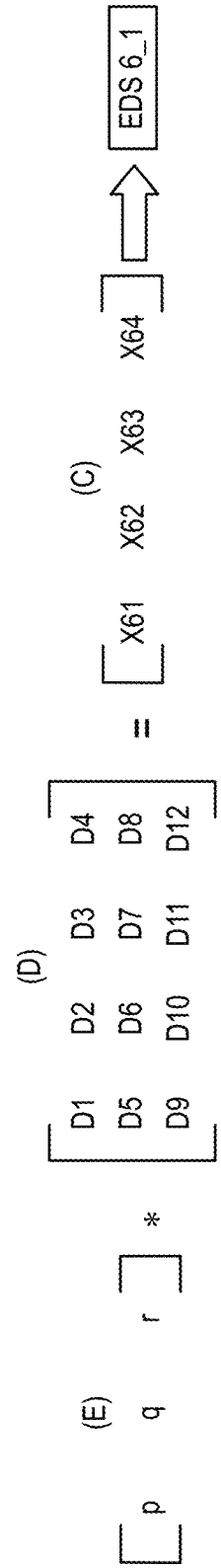
FIG. 18 illustrates another specific example of dispersed storage error encoding in accordance with the present invention.

FIG. 18 illustrates another specific example of dispersed storage error encoding with the pillar width number of six and the decode threshold number of three. This example relates to the dispersed storage system shown in FIGS. 11-17, where a computing device has determined to rebuild encoded data slice 5_1 by producing an encoded data slice EDS 6_1 for storage in storage unit #6 36.

In an example of operation, the computing device obtains the encoding matrix and selects the row (e.g., the sixth (e.g., coefficients p, q, r)) of the encoding matrix corresponding to EDS 6_1. The computing device obtains the data matrix and matrix multiplies the selected row of the encoding matrix with the data matrix to produce encoded data slice EDS 6_1.

Figure 19:
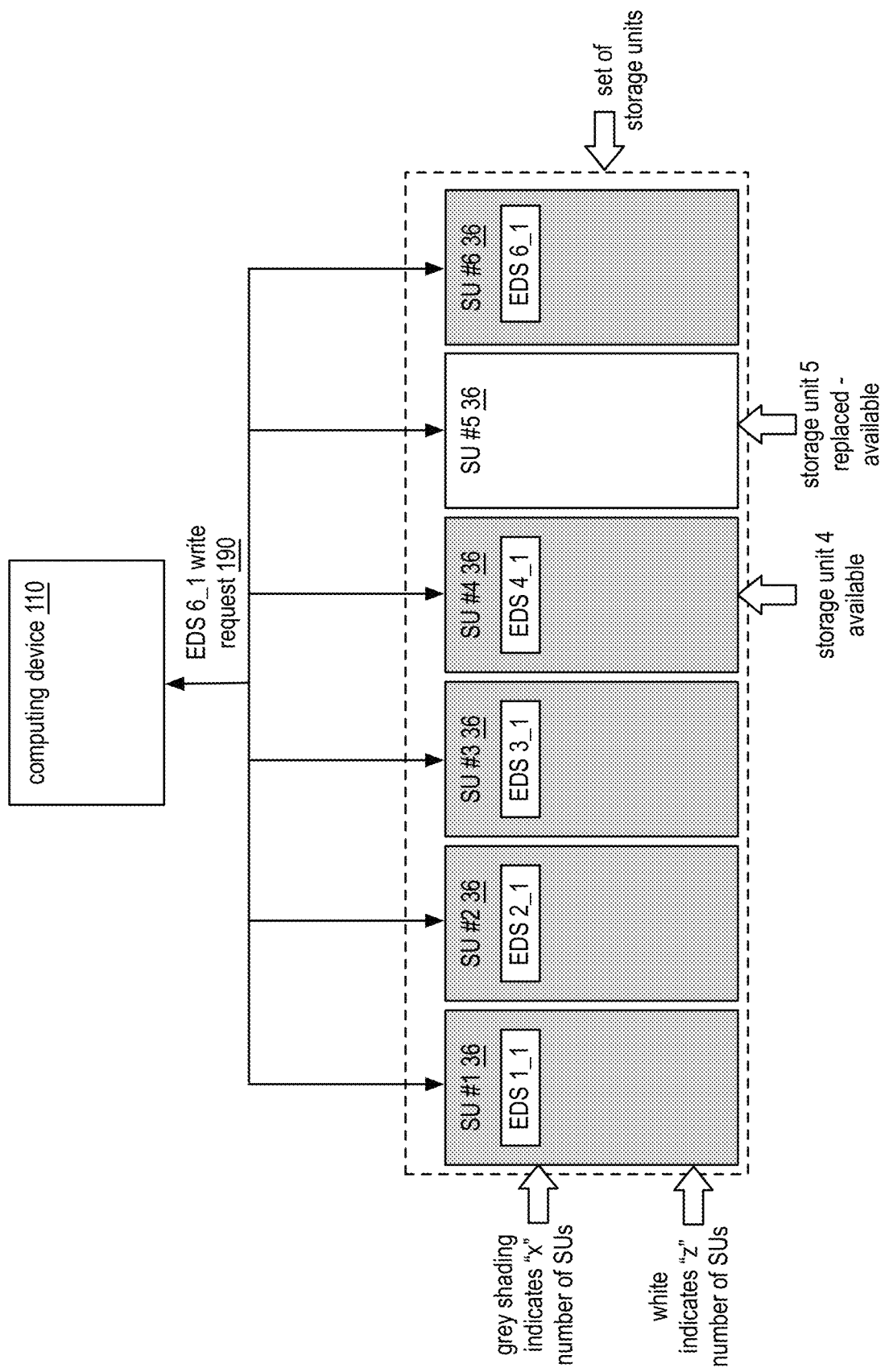
FIG. 19 is a schematic block diagram of another embodiment of a dispersed storage system encoding in accordance with the present invention.

FIG. 19 is a schematic block diagram of another embodiment of a dispersed storage system or network that includes the computing device 110 and the set of storage units 36. The computing device 110 may be implemented by a DS processing module 90 of FIG. 9, one or more of the computing devices 12-16, the managing unit 18, the storage unit 36, and the integrity processing unit 20 of FIG. 1. Each storage unit 36 may be implemented utilizing a storage server, a computing device and one or more memory devices.

Continuing with the example of operation of FIG. 18, the computing device, having generated the encoded data slice EDS 6_1, sends a write request 190 to storage unit #6 36 that includes the encoded data slice EDS 6_1 for storage therein. Note storage unit 4 is available (e.g., back online) and is storing encoded data slice EDS 4_1 and storage unit 5 has been replaced and is available. Thus, at this time, the "x" number of storage units is five and the "z" number of storage units is one.

Figure 20:
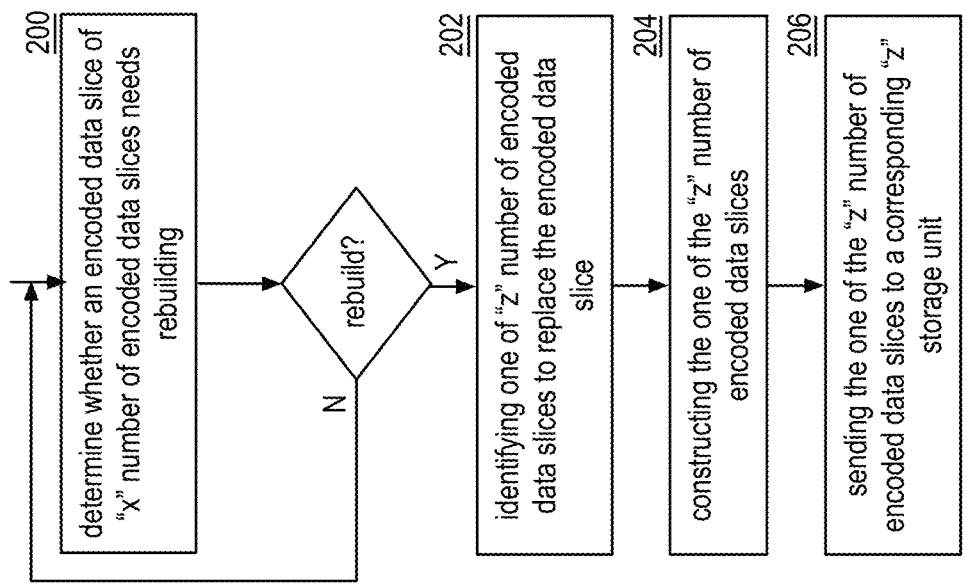
FIG. 20 is a schematic block diagram of an example of a method of rebuilding an encoded data slice encoding in accordance with the present invention.

FIG. 20 is a schematic block diagram of an example of a method of rebuilding an encoded data slice in a dispersed storage network (DSN) (e.g., a dispersed storage system). The method includes step 200, where a computing device of the DSN determines whether an encoded data slice of "x" number of encoded data slices of a set of encoded data slices requires rebuilding.

Note that a data segment of a data object is dispersed storage error encoded to produce the set of encoded data slices, and the set of encoded data slices includes a pillar width number of encoded data slices. Further note that the "x" number of encoded data slices is stored in "x" number of storage units of a pillar width number of storage units and "x" is equal to or greater a write threshold number of encoded data slices of the set of encoded data slices and is less than the pillar width. Still further note that "z" number of encoded data slices corresponds to encoded data slices of the set of encoded data slices that are not currently stored in "z" number of storage units of the pillar width number of storage units and "z" is equal to the pillar width number minus "x".

In an example, the computing device determines the "x" number by sending a subset of listing requests to storage units of the pillar width number of storage units. The computing device then determines the "x" number based on the favorable listing responses from at least some of storage units. In another example, the computing device determines the "x" number by receiving the "x" number. In another example, the computing device determines the "x" number by obtaining the "x" number by performing a lookup in a lookup table.

When the encoded data slice requires rebuilding, the method continues to step 202, where the computing device identifies one of the "z" number of encoded data slices of the set of encoded data slices to replace the encoded data slice. The identifying one of the "z" number of encoded data slices includes identifying a storage unit of the "z" number of storage units that is mapped to store a respective encoded data slice of the "z" number of encoded data slices, wherein the identifying is based on one or more of determining the storage unit has been recently restored, determining the storage unit has been recently upgraded, determining the storage unit has not been used previously for the set of encoded data slices, and determining the storage unit is within a performance range of other storage units in the "x" number of storage units. The computing device then selects the respective encoded data slice as the one of the "z" number of encoded data slices.

The method continues to step 204, where the computing device constructs the one of the "z" number of encoded data slices from a decode threshold number of encoded data slices of the "x" number of encoded data slices. In one example, the constructing the one of the "z" number of encoded data slices includes retrieving the decode threshold number of encoded data slices, dispersed storage error decoding the decode threshold number of encoded data slices to reconstruct the data segment, and dispersed storage error encoding the reconstructed data segment to produce the one of the "z" number of encoded data slices.

In one example, the dispersed storage error encoding includes arranging the reconstructed data segment into a data matrix, obtaining (e.g., receiving, generating) an encoding matrix, selecting a row of the encoding matrix that corresponds to the one of the "z" number of encoded data slices, and matrix multiplying the selected row of the encoding matrix with the data matrix to produce the one of the "z" number of encoded data slices.

The method continues to step 206, where the computing device sends the one of the "z" number of encoded data slices to a corresponding storage unit of the "z" number of storage units. Note that upon storage of the "z" number of encoded data slices, the "x" number is updated to include storage of the additional encoded data slice. Further note a computing device that includes memory and an interface operably coupled to a processing module, where the processing module is operable to perform one or more of the method steps and/or functions of the preceding figures. Further note, a computer readable storage device (e.g., computer readable memory) include one or more memory elements that are operable to storage operational instructions, that when executed by a computing device, causes the computing device to perform one or more of the method steps and/or functions of the preceding figures.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data'). In addition, the terms "slice" and "encoded data slice" are used interchangeably.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device within a storage network, the method comprises:
   determining whether an encoded data slice of "x" number of encoded data slices associated with a set of encoded data slices requires rebuilding, wherein:
      a data segment of a data object is dispersed storage error encoded to produce the "x" number of encoded data slices,
      the set of encoded data slices includes a pillar width number of encoded data slices,
      the "x" number of encoded data slices is stored in a set of storage units of the storage network and the encoded data slice is stored in a first storage unit of the set of storage units, "x" is equal to or greater than a write threshold number of encoded data slices of the set of encoded data slices and is less than or equal to the pillar width number,
a "z" number of encoded data slices corresponds to encoded data slices of the set of encoded data slices that are not currently stored in the set of storage units, and
"z" is equal to the pillar width number minus "x"; and
when the encoded data slice requires rebuilding:
identifying one of the "z" number of encoded data slices of the set of encoded data slices to replace the encoded data slice;
constructing the one of the "z" number of encoded data slices from a decode threshold number of encoded data slices of the "x" number of encoded data slices to produce a new one of the "x" number of encoded data slices; and
sending the new one of the "x" number of encoded data slices to a second storage unit of the set of storage units for storage therein.

2. The method of claim 1, wherein determining a current "x" number comprises:
receiving, from storage units of the set of storage units, favorable listing responses to a listing request for the "x" number of encoded data slices, wherein a first favorable listing response of the favorable listing responses indicates a corresponding storage unit is storing a corresponding encoded data slice of the "x" number of encoded data slices.

3. The method of claim 2 further comprises:
determining an additional encoded data slice of the set of encoded data slices is stored in the set of storage units, wherein the additional encoded data slice was not included in the favorable listing responses; and
updating the "x" number based on the additional encoded data slice.

4. The method of claim 1, wherein determining a current "x" number comprises:
receiving the "x" number.

5. The method of claim 1, wherein determining a current "x" number comprises:
obtaining the "x" number by performing a lookup in a lookup table.

6. The method of claim 1, wherein the identifying the one of the "z" number of encoded data slices comprises:
identifying a storage unit of the set of storage units that is mapped to store a respective encoded data slice of the "z" number of encoded data slices.

7. The method of claim 6, wherein the identifying the storage unit is based on determining the storage unit has been recently restored.

8. The method of claim 6, wherein the identifying the storage unit is based on determining the storage unit has been recently upgraded.

9. The method of claim 6, wherein the identifying the storage unit is based on determining the storage unit has not been used previously for the set of encoded data slices.

10. The method of claim 6, wherein the identifying the storage unit is based on determining the storage unit is within a performance range of other storage units in the set of storage units.

11. The method of claim 1, wherein the constructing the one of the "z" number of encoded data slices comprises:
retrieving the decode threshold number of encoded data slices;
dispersed storage error decoding the decode threshold number of encoded data slices to reconstruct the data segment; and
dispersed storage error encoding the reconstructed data segment to produce the one of the "z" number of encoded data slices.

12. The method of claim 11, wherein the dispersed storage error encoding comprises:
arranging the reconstructed data segment into a data matrix;
obtaining an encoding matrix;
selecting a row of the encoding matrix that corresponds to the one of the "z" number of encoded data slices; and
matrix multiplying the selected row of the encoding matrix with the data matrix to produce the one of the "z" number of encoded data slices.

13. A computing device of a storage network comprises:
memory;
an interface; and
a processing module operably coupled to the interface and the memory, wherein the processing module is operable to:
determine whether an encoded data slice of "x" number of encoded data slices associated with a set of encoded data slices requires rebuilding, wherein:
a data segment of a data object is dispersed storage error encoded to produce the "x" number of encoded data slices,
the set of encoded data slices includes a pillar width number of encoded data slices,
the "x" number of encoded data slices is stored in a set of storage units of the storage network and the encoded data slice is stored in a first storage unit of the set of storage units,
"x" is equal to or greater than a write threshold number of encoded data slices of the set of encoded data slices and is less than or equal to the pillar width number,
a "z" number of encoded data slices corresponds to encoded data slices of the set of encoded data slices that are not currently stored in the set of storage units, and
"z" is equal to the pillar width number minus "x"; and
when the encoded data slice requires rebuilding:
identify one of the "z" number of encoded data slices of the set of encoded data slices to replace the encoded data slice;
construct the one of the "z" number of encoded data slices from a decode threshold number of encoded data slices of the "x" number of encoded data slices to produce a new one of the "x" number of encoded data slices; and
send, via the interface, the new one of the "x" number of encoded data slices to a second storage unit of the set of storage units for storage therein.

14. The computing device of claim 13, wherein the processing module is operable to determine a current "x" number by:
receiving, via the interface and from storage units of the set of storage units, favorable listing responses to a listing request for the "x" number of encoded data slices, wherein a first favorable listing response of the favorable listing responses indicates a corresponding storage unit is storing a corresponding encoded data slice of the "x" number of encoded data slices.

15. The computing device of claim 14, wherein the processing module is further operable to:

determine an additional encoded data slice of the set of encoded data slices is stored in the set of storage units, wherein the additional encoded data slice was not included in the favorable listing responses; and update the "x" number based on the additional encoded data slice.

16. The computing device of claim 13, wherein the processing module is further operable to determine a current "x" number by obtaining the "x" number by performing a lookup in a lookup table.

17. The computing device of claim 13, wherein the processing module is further operable to identify one of the "z" number of encoded data slices by identifying a storage unit of the set of storage units that is mapped to store a respective encoded data slice of the "z" number of encoded data slices.

18. The computing device of claim 17, wherein the processing module is operable to identify the storage unit based on determining the storage unit has been recently restored.

19. The computing device of claim 17, wherein the processing module is operable to identify the storage unit based on determining the storage unit has been recently upgraded.

20. The computing device of claim 17, wherein the processing module is operable to identify the storage unit based on determining the storage unit has not been used previously for the set of encoded data slices.

* * * * *